United States Patent [19]

Nishiyama

[11] Patent Number: 5,307,213
[45] Date of Patent: Apr. 26, 1994

[54] DATA REPRODUCING APPARATUS FOR ELIMINATING UNDERSHOOTS IN THE VICINITY OF THE OUTER EDGES OF A MAGNETIC POLE

[75] Inventor: Nobumasa Nishiyama, Hachioji, Japan

[73] Assignee: Hitachi, Ltd., Tokyo, Japan

[21] Appl. No.: 798,944

[22] Filed: Nov. 27, 1991

[30] Foreign Application Priority Data

Nov. 30, 1990 [JP] Japan .................................. 2-337076

[51] Int. Cl.$^5$ ..................... G11B 5/09; G11B 5/035; G11B 5/02
[52] U.S. Cl. ................................... 360/46; 360/65; 360/67
[58] Field of Search ............................ 360/46, 65, 67

[56] References Cited

U.S. PATENT DOCUMENTS

| | | | |
|---|---|---|---|
| 4,580,178 | 4/1986 | Wuori et al. | 360/67 |
| 4,900,100 | 3/1990 | Nishiyama et al. | 360/45 |
| 4,942,485 | 7/1990 | Umehara et al. | 360/46 |
| 5,068,753 | 11/1991 | Kanegae | 360/46 |

FOREIGN PATENT DOCUMENTS 61-59664 3/1986 Japan .

Primary Examiner—Aristotelis Psitos
Assistant Examiner—Jennifer Pearson
Attorney, Agent, or Firm—Fay, Sharpe, Beall, Fagan, Minnich & McKee

[57] ABSTRACT

A system which records and reproduces a digital signal in the form of a magnetic reversal on and from a recording medium includes a magnetic head for reproducing data recorded on the recording medium; an automatic gain control unit for controlling the reproduced signal so as to have a constant amplitude; an equalizer for processing the output waveform from the automatic gain control unit; a differentiator for changing the output from the equalizer to a differentiated waveform; a low pass filter for limiting the signal band of the differentiated waveform; a low pass filter for limiting the signal band of the equalizer output; a pulser for receiving the equalizer output, the band of which is limited by the low pass filter and the differentiated waveform, the band of which is limited; a differentiator for receiving the output from the automatic gain control unit and producing a differentiated signal from the output signal; an attenuator for attenuating the differentiator output; and a waveform processor for adding the attenuated differentiated signal to the band-limited differentiated waveform and inputting the resulting signal to the pulser.

12 Claims, 9 Drawing Sheets $$\tau_{-1} + \tau_{-2P} \doteq \frac{1}{V} \times (\frac{g\ell}{2} + P_{LP}) \times k$$

$$\tau_{-1} + \tau_{-2f} \doteq \frac{1}{V} \times (\frac{g\ell}{2} + P_{Lf}) \times k$$

$$\tau_{1} + \tau_{2P} \doteq \frac{1}{V} \times (\frac{g\ell}{2} + P_{UP}) \times k$$

$$\tau_{1} + \tau_{2f} \doteq \frac{1}{V} \times (\frac{g\ell}{2} + P_{Uf}) \times k$$

K IS A COEFFICIENT DETERMINED BY A QUANTITY OF FLOATING OF THE MAGNETIC HEAD

DATA REPRODUCING APPARATUS FOR ELIMINATING UNDERSHOOTS IN THE VICINITY OF THE OUTER EDGES OF A MAGNETIC POLE

BACKGROUND OF THE INVENTION

The present invention relates to digital magnetic recording and reproducing apparatus using a thin film magnetic head, and more particularly to an equalized signal processing system in a peak sense type reproduced signal processing apparatus for eliminating an undershoot in a signal waveform reproduced by a thin film magnetic head.

A digital magnetic recording and reproducing apparatus using a peak sense system uses a thin film magnetic head to obtain a sharp recording magnetic field as the recording density becomes higher. However, if a thin film magnetic head is used, peaks 401, 402 (FIG. 3) of the reproduced waveform called undershoots and opposed in polarity to a main peak of the reproduced waveform appear in the vicinity of the outer edges 404 of a thin film magnetic pole 409, as shown by the broken lines 403, because the pole length is limited. When pattern data are recorded and reproduced, the undershoots interfere with the reproduced waveform in the vicinity thereof, so that the pattern peak shift increases.

Conventionally, such an undershoot is eliminated using a transversal equalizer disclosed in Japanese Patent Publication JP-A 61-59664. The equalizer creates an echo signal comprising a timewise deviated version of the input signal through a delay circuit and adds the echo signal and the input signal at a particular ratio. To level off the undershoot portion, the undershoot eliminating unit performs the following functions. The first is to delay the echo signal to the position of the undershoot portion of the input signal using the delay circuit, and the second is to add the echo signal and the input signal. A compensating signal for leveling off the undershoot is deviated to the position of the undershoot by a fixed delay element.

SUMMARY OF THE INVENTION

As the storage capacity increases, the recording density also increases and the medium coercivity must be increased compared to the conventional one. To this end, the recording magnetic field of the magnetic head must be increased compared to the conventional one. In order to increase the recording magnetic field, the thin film magnetic head which is used at present is employed for increasing the thickness of the poles, for example, to several $\mu m$-10 $\mu m$ as shown by the solid lines 405 of FIG. 3.

Thus, in the recording and reproducing apparatus which perform recording and reproducing operations by the same thin film magnetic head, the positions where undershoots 406, 407 of a waveform 408 are reproduced by the thin film magnetic head further deviate from the position of the main peak 409 compared to the conventional apparatus.

In order to perform a waveform processing comprising removal of a timewise past undershoot 406 compared to the main peak on the input waveform (hereinafter referred to as a pre-undershoot) in a conventional transversal equalizer of FIG. 4, a waveform analog to the input waveform 505 is required to be transmitted to 506 without distortions. However, the time difference between the positions where each of the undershoots and the main peak occur is large, so that the delay time of delay 501 is required to be increased. The delay time which has been, for example, about 70 ns is required to be increased to about 200-350 ns. As the delay time increases, the transfer characteristic of the elements is deteriorated, so that the input waveform 505 cannot be transmitted to 506 without distortions. That is, there is the problem with the conventional transversal equalizer that correct waveform equalization cannot be achieved due to an insufficient transfer characteristic of the delay line.

Since constant angular velocity of rotation is generally possessed by a magnetic disk, the inner and outer peripheral linear velocities of the disk differ. Thus, with a superthick pole thin film magnetic head, the position on the inner disk periphery where an undershoot occurs differs greatly from the position on the outer disk periphery where another undershoot occurs, so that fixed delay elements cannot solve this problem in the conventional techniques.

If a transversal equalizer is used in a waveform equalizing unit in order to solve the above problem, a tap for correcting the pre-undershoots is eliminated and only delay elements having relatively short delay times for exacting an echo signal are used to thin the waveform in the non-distortion transmission interval.

The eliminated tap is replaced with an equivalent manner as follows. As a reproduced signal having a fixed amplitude from an automatic gain control unit (AGC) passes through an equalizer, differentiator and low-pass filter (LPF), it is delayed because it takes time for the reproduced signal to pass through those elements. The delayed signal is added to a signal which has passed through the differentiator from the AGC and has an appropriately attenuated amplitude to thereby compensate for the undershoots. In this case, in order to compensate for each other's time delay, delay elements having relatively short delay times, for example, of about 100 ns are used, which causes no problems because such delay elements have an excellent transfer characteristic.

In a system which records data in a plurality of zones on a disk face that are different in data capacity from each other (hereinafter referred to as a constant density recording (CDR) system), the recording and reproducing frequency varies from zone to zone. Therefore, the cutoff frequency of a low pass filter (LPF) is adjusted to an appropriate frequency for each zone. The signal transmission time for the low pass filter is inversely proportional to the cutoff frequency, so that a control means is provided for optimally setting a delay time for each zone.

If the pole length of the magnetic head and the rotational speed of the magnetic disk are determined, there is the feature that the positions where undershoots occur are determined in accordance with a radial position of the magnetic head and a floating distance of the head from the magnetic layer. In order to change the delay time of the undershoot compensating circuit in conformity to the position of the undershoots, a tapped delay element to provide tap selection control in accordance with the radial position signal from the magnetic head is used. Alternatively, tap selection control of the delay elements may be provided by using the automatic equalizer disclosed in Japanese Patent Publication JP-A 1-82303. If the delay elements provide respective variable delay time lengths, means for controlling the delay time lengths may be used.

Depending on a process for designing the apparatus, it is recommendable to use only an equalizer which eliminates not both undershoots, but a backward easily removable undershoot (hereinafter referred to as a post-undershoot) if a quantity of peak shift due to the interference by the undershoots is small or the influence of the interference of the undershoots is small. In this case, only the waveform equalizing unit is required to be replaced with the equalizer, mentioned above.

By the above means, waveform equalization distortions due to an insufficient transmission characteristic of delay elements having large delay times are eliminated. In addition, undershoots remote from the main peak are also eliminated. Therefore, the pattern peak shift caused by the undershoots is decreased. Also if the position of the occurring undershoots changes due to the inner and outer peripheral linear velocities of the disk, the undershoots are eliminated. When only the post-undershoot is eliminated, the circuit configuration is simplified to reduce the pattern peak shift.

As described above, the present invention is a system which records and reproduces a digital signal in the form of a magnetic reversal on and from a recording medium, comprising a magnetic head for reproducing data recorded on the recording medium, an automatic gain control unit for controlling the reproduced signal so as to have a constant amplitude, an equalizer for processing the output waveform from the automatic gain control unit, a differentiator for changing the output from the equalizer to a differentiated waveform, a low pass filter for limiting the signal band of the differentiated waveform, a low pass filter for limiting the signal band of the equalizer output, a pulser for receiving the equalizer output, the band of which is limited by the low pass filter and the differentiated waveform the band of which is limited, a differentiator for receiving the output from the automatic gain control unit and producing a differentiated signal from the output signal, an attenuator for attenuating the differentiator output, and waveform processing means for adding the attenuated differentiated signal to the band-limited differentiated waveform and inputting the resulting signal to the pulser.

The present invention is also a data reproducing apparatus for reproducing a signal magnetically recorded on a recording medium using a magnetic head, comprising an equalizer for receiving a reproduced signal waveform from the magnetic head and equalizing a post-undershoot thereof, a first differentiator for receiving the output from the equalizer, a low pass filter for receiving the output from the first differentiator, a second differentiator for receiving the reproduced signal waveform, and a first adder for adding the outputs from the second differentiator and the low pass filter.

In one aspect, the present invention is a method of recording and reproducing a digital signal in the form of a magnetic reversal on and from a recording medium, comprising the steps of extracting a reproduced signal from said recording medium using a magnetic head; dividing the reproduced signal into two; causing one of the divided signals to pass through a first system comprising an equalizer, a differentiator and a low pass filter; causing the other of the divided signals to pass through a second system comprising a differentiator and an attenuator; synthesizing the outputs from the first and second systems to equalize the reproduced waveform; and setting the difference between the times required for the signals to pass through the first and second systems such that an undershoot portion of the reproduced waveform in the first system overlaps with the reproduced signal portion in the second system.

In another aspect, the present invention is an apparatus for recording and reproducing a digital signal in the form of a magnetic reversal on and from a recording medium, comprising a delay element for producing a delay signal and having a plurality of taps through which partially delayed signals are extracted, one of the taps being selected by a signal indicative of a radial position of the magnetic head.

In a further aspect, the present invention is an apparatus for recording and reproducing a digital signal in the form of a magnetic reversal on and from a recording medium using a thin film magnetic head, comprising an equalizer in a reproduced signal processing system of the apparatus, the equalizer including a delay element having a delay time less than a time equal to the value obtained by dividing by the peripheral speed of the disk the product of a pole length of the head and a coefficient determined by a distance from the recording medium.

DETAILED DESCRIPTION OF THE PREFERRED EMBODIMENTS

Embodiment 1

Figure 1:
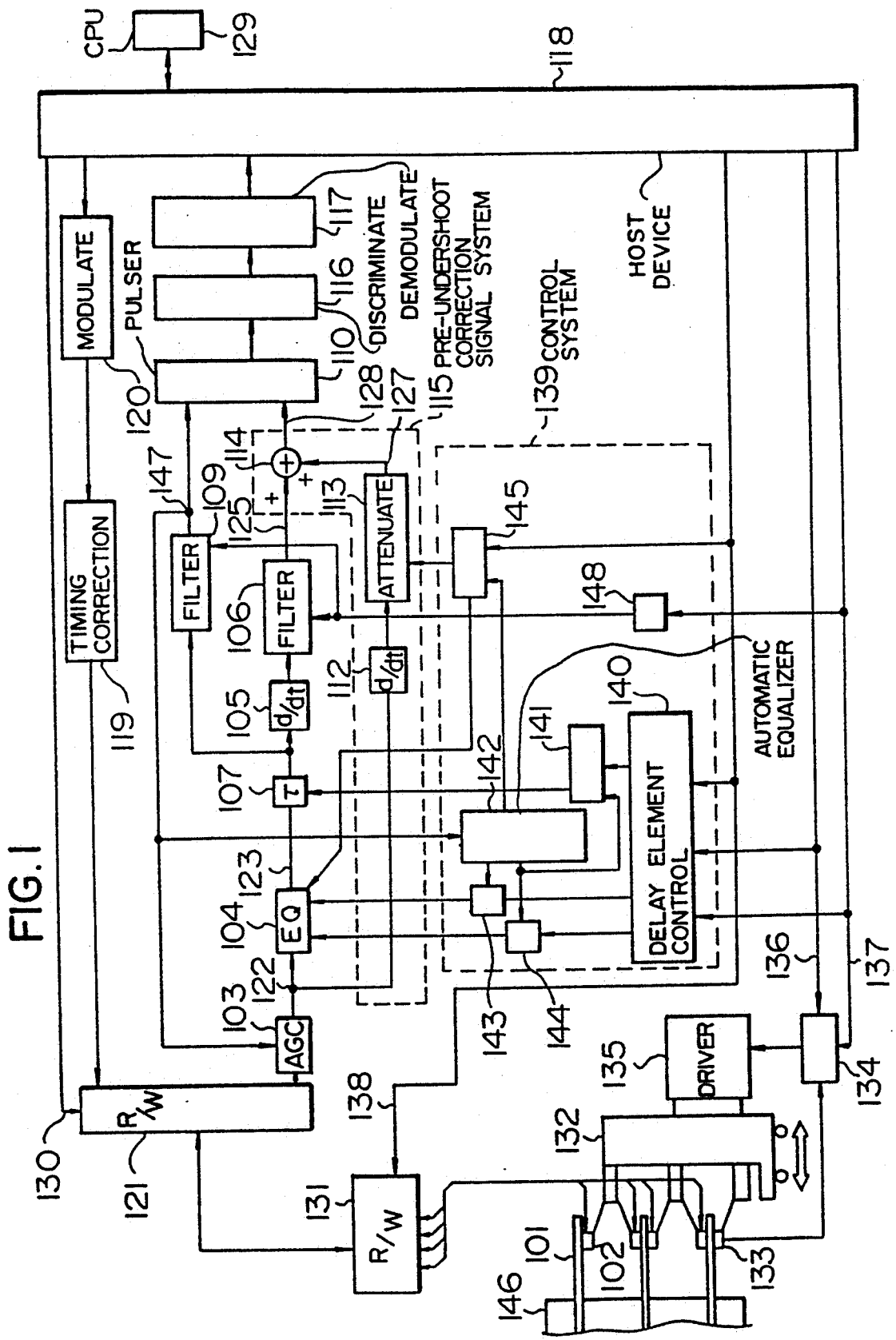
FIG. 1 is a block diagram indicative of the circuit configuration of a recording and reproducing system according to the present invention.

A recording and reproducing system of a magnetic disk using a peak sense system will be described with reference to FIG. 1.

In recording, host device 118 receives from computer (CPU) 129 data to be recorded and controls the data for recording and reproducing purposes. To this end, host device 118 outputs a target radial position signal 136 indicative of which cylinders of a disk the data should be recorded on. Comparator 134 compares the output from host device 118 and a servo output from servo head 133. If there is any difference between those outputs, a signal indicative of the difference is output to actuator driver 135 which deviates the radial position of the magnetic head. Driver 135 moves actuator 132 to deviate the radial position of the magnetic head while reading the output from servo head 133 to correct the radial position until the target radial position is attained. If the positioning is complete, host device 118 delivers to modulator 120 data to be recorded in a user region while reproducing format data on the track concerned.

Modulator 120 converts the data to a code that is easy to record. Thereafter, it inputs the modulated code to timing correction unit 119 to correct the writing timing. Timing correction unit 119 outputs the corrected recording code to read/write selector 121, and to recording and reproducing unit 131, which selects a recording head in accordance with a head select signal 138 and outputs a recording current through the selected magnetic head 102 so as to record a recording code "1" as a magnetic reversal on recording medium 101.

In reproduction, the positioning system positions the magnetic head and selects a head. Magnetic head 102 reproduces the data recorded as a magnetic reversal on recording medium 101. The reproduced signal is delivered through recording and reproducing unit 131 and read/write selector 121 to automatic gain control unit (AGC) 103, which outputs a reproduced signal having a fixed amplitude to equalizer (EQ) 104, which performs waveform equalization comprising a reduction in the width of the waveform and eliminates a post-undershoot of the reproduced waveform. The equalized waveform output is input to low pass filter 109 and also to differentiator 105.

In order to convert a peak of the reproduced waveform to a zero-cross signal, differentiator 105 produces a timewise differentiated version of the reproduced waveform. The output from the differentiator is input to low pass filter 106. Filters 106, 109 perform a band limitation to filter out noise other than the signal. The respective outputs from the filters are input to pulser 110 to produce a pulse signal from a zero-cross portion of the reproduced waveform code "1". Pulser input 147 generates a signal waveform having a fixed amplitude by feeding back a part of the output of low pass filter 109 to AGC 103. The pulse signal produced by pulser 110 is input to discriminator 116 which recovers the recorded code from the pulse signal. The recovered recorded code is input to demodulator 117 where it is demodulated. The demodulated data are delivered to host device 118 and hence to CPU 129.

The present invention is a signal processing system for eliminating waveform processing distortions due to an insufficient transmission characteristic of a delay element used in equalizer 104.

An embodiment of the present invention will be described with reference to FIGS. 1 and 2. Two features of the circuit configurations of the present invention are as follows. The first feature refers to the waveform processing system covering the circuit from the output from AGC 103 of the reproduction signal processing end to the input to pulser 110 of the differentiated signal processing system. The second feature is a control system which controls a delay time of the waveform processing system.

The circuit configuration as the first feature will be described. AGC output 122 is input to equalizer 104 which performs no waveform processing operation of pre-undershoot 406 to avoid the insertion of a delay element having a large delay time into a non-distortion transmission interval. In order to remove pre-undershoot 406, the signal waveform itself is required to be delayed but the large-delay element causes a deterioration in the waveform. Thus, pre-undershoot 406 remains in equalizer output 123.

However, a delay element having a delay time $\tau$-1 is inserted in equalizer 104 to thin the waveform, so that equalizer 104 has a processing delay time of about $\tau$-1 as a group delay. The equalizer output is then input to differentiator 105 through delay unit 107 to produce a differentiated signal 124, which is then input to low pass filter 106 to provide only a required band signal 125. At this time, since the group delay time $\tau$ LPF of low pass filter 106 is large, it acts in place of a delay element having a large delay time.

Pre-undershoot correction signal system 115 receives AGC output 122 to produce a differentiated waveform in differentiator 112. Thereafter, attenuator 113 makes an adjustment such that the amplitude 201 of pre-undershoot 406 to be corrected and the amplitude 202 of the differentiated waveform obtained from the main peak of the AGC output coincide. The delay time $\tau$d of delay element 107 is controlled such that pre-undershoot 406 of the differentiated signal system and the differentiated waveform of the undershoot correction signal system coincide in position. The delay time $\tau$d at that time is set as follows:

$$\tau d = (Tprus + \tau ddt_2) - (\tau - 1 + \tau ddt_1 + \tau LPF)$$

where Tprus is the time interval between the pre-undershoot peak and the main peak, $\tau ddt_2$ is the delay time of differentiator 112 in the pre-undershoot correction system, $\tau$-1 is the delay time of equalizer 104, $\tau ddt_1$ is the delay time of differentiator 105, and $\tau$LPF is the delay time of LPF 106.

Last, the attenuator output 127 comprising the addition of the pre-undershoot 406 amplitude and the corrected undershoot signal amplitude is added to LPF output 125 in waveform synthesizer 114 to thereby provide a differentiated waveform 128 where pre-undershoot 406 is suppressed.

Another input to pulser 110 comprises a signal obtained from delay element 107 through LPF 109, the output of which is also input to AGC 103.

Next the circuit configuration of a control system 139 which controls the delay time of the second waveform processing system will be described.

For an isolated waveform reproduced by the thin film head, the positions where the undershoots occur and the width of the waveform vary depending on the peripheral speeds of the disk and the head floating distance. In the case of a magnetic disk, its inner and outer peripheral speeds differ from each other, so that the above mentioned influence appears. Thus, the respective delay times of the delay elements in the waveform processing system are controlled such that the waveform is thinned and the suppressed undershoot is maintained in an optimal state at all times on the basis of the signal indicative of the radial position of the magnetic head. To this end, the circuit configuration is such that a signal 136 indicative of the target radial position is input to delay element control unit 140 from host device 118. Head select signal 138 indicative of a specified head which has produced the reproduced signal is input to control unit 140 as well.

If a CDR system, as mentioned above, is used, the transfer rate changes, so that the delay time of the equalizer changes and the optimal cutoff frequencies of low pass filters 106, 109 change as well. If the cutoff frequencies of the low pass filters change, the group delay time changes. Thus, the respective delay times of the equalizer and timing correction delay elements are required to be changed.

To this end, zone number signal 137 is also input to delay element control unit 140. The respective delay time data set before shipping are read from a non-volatile memory in delay element control unit 140 on the basis of the three signals and output to respective delay element control units 141, 143, 144 which set the respective delay times of the delay elements of equalizer 104 and delay element 107 on the basis of data on the set delay times.

If the reproduction head is replaced with another one, the magnitude of its undershoots generally changes. Quantities of attenuation of attenuators 113 in undershoot correction signal system 115 and of undershoot correction attenuator in equalizer 104 are controlled by attenuation quantity control unit 145, which reads data on quantities of attenuation from a nonvolatile memory in which the respective quantities of attenuation for the heads are beforehand set before shipping and controls attenuation 113. Thus, optimal waveform equalization is achieved.

If the influence of aging and unevenness of the parts concerned is significant, automatic equalizer 142 disclosed in Japanese Patent Publication JP-A 1-82303 is used to correct the respective delay times and quantities of attenuation of the elements. The automatic equalizer is connected such that the output 147 of low pass filter 109 is input to automatic equalizer 142, which corrects the respective delay times of the delay elements and outputs the resulting signal to the respective delay element control units 141, 143, 144, and also performs the attenuation quantity correction and provides the resulting signal to attenuation quantity control unit 145.

In order to control the cutoff frequencies of low pass filters 106, 109 in the CDR system, zone number signal 137 is input to control unit 148 for controlling purposes.

The above description referred to the circuit configuration of the embodiment of the present invention and the waveforms generated by the elements concerned.

Figure 4:
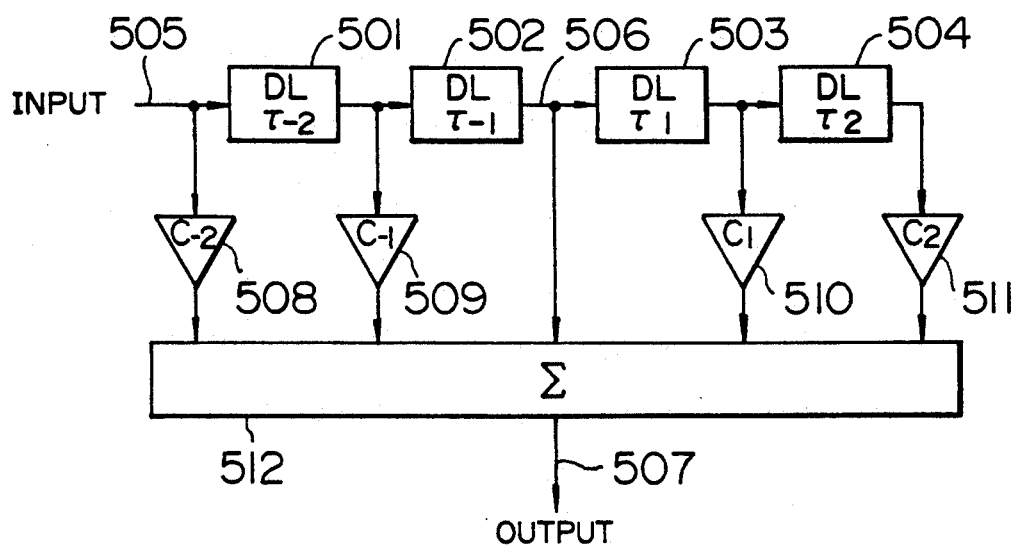
FIG. 4 is a block diagram of a conventional transversal equalizer.
Figure 5:
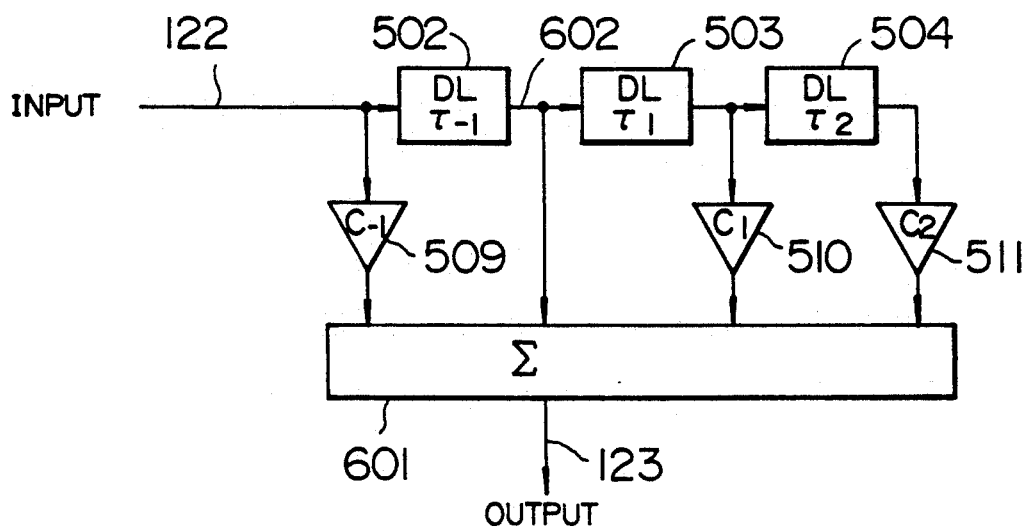
FIG. 5 is a block diagram indicative of a first embodiment of an equalizer used in the present invention.

A first embodiment of equalizer 104 used in this signal processing system will be described with reference to FIG. 5. As shown in FIG. 2, the equalizer used in the present invention does not perform a waveform processing operation comprising removal of undershoot 406, so that it includes the conventional equalizer of FIG. 4 except for delay element 501. In operation, AGC output 122 is delivered through delay elements 502 without distortions to adder 601. AGC output 122 is also input to coefficient circuit 509 where an attenuation signal to thin the leading edge of the waveform is produced and input to adder 601. The output signal 602 from delay element 502 is input to coefficient circuit 510 through delay element 503 where an attenuation signal to thin the trailing end of the waveform is produced, which is then input to adder 601. The output from delay element 503 is input to coefficient circuit 511 through delay element 504. Coefficient circuit 511 produces an attenuation signal to correct a time delayed undershoot (described as the post-undershoot) 407. This attenuation signal is also input to adder 601, which adds all the input signals thereto to provide a waveform output 123 having a narrow width without post-undershoot 407.

Embodiment 2

A second embodiment of the present invention will be described with reference to FIGS. 3, 6, 7, 8 and 9. The following two effects will be seen by observing the shape of an undershoot in detail. First, since a magnetic head having thick poles is used, the positions where the undershoots occur have timewise moved away from the main pole: that is, from 401 to 406, and from 402 to 407 in FIG. 3. Second, on the undershoot waveforms, the waveform shape which is near the main peak changes rapidly while the waveform shape remote from the main peak is gradually recovered. This phenomenon does not often occur in the conventional system.

Figure 6:
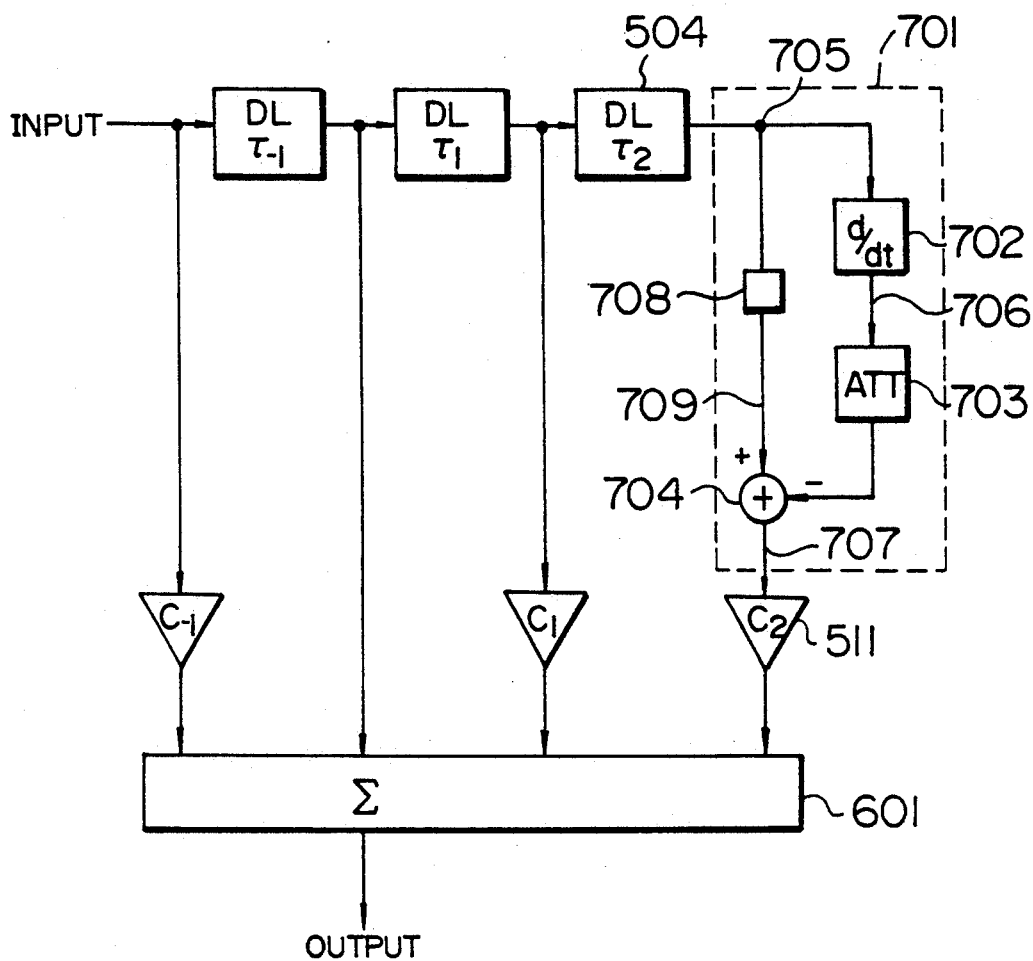
FIG. 6 is a block diagram indicative of a second embodiment of the equalizer.
Figure 7:
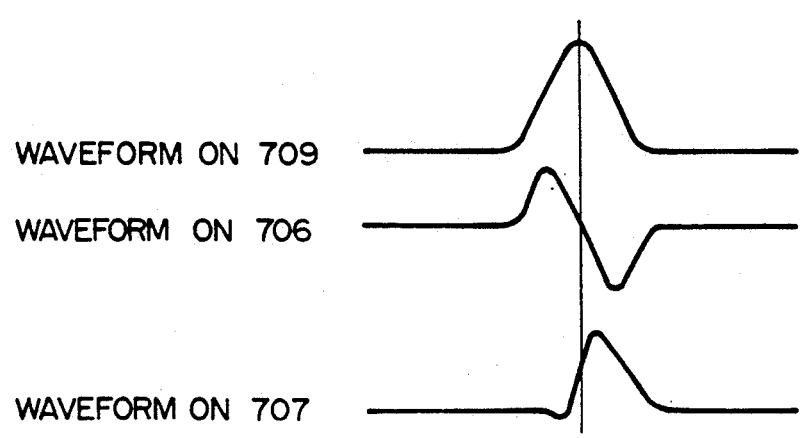
FIG. 7 shows the waveforms generated at the main elements of the FIG. 6 equalizer.

The second embodiment refers to a process for correcting the shape of the undershoots. Equalizer 104 of this embodiment will be described in terms of its circuit configuration in FIG. 6 and in terms of its main waveform in FIG. 7. The undershoot correction circuit 701 of FIG. 6 is different from that of the first embodiment. In the second embodiment, output 705 from delay element 504 is input to differentiator 702 and also to adder 704 through timing correction delay element 708. Differentiator 702 produces a differentiated version 706 of delay element output 705 and the differentiated version 706 is input to attenuator (ATT) 703, which attenuates the amplitude of the signal and outputs it to adder 704. Adder 704 subtracts the output of attenuator 703 from the delay element 709 output to provide waveform 707 which has a rapidly rising leading edge and a gently sloping trailing edge. The quantity of attenuation of attenuator 703 and the quantity of delay of timing correction delay element 708 are determined such that output waveform 707 is substantially analogous to post-undershoot 407. Output waveform 707 is input to coefficient circuit 511 such that it has the same amplitude as post-undershoot 407. The coefficient circuit output is input to adder 601 to eliminate the post-undershoot.

Figure 2:
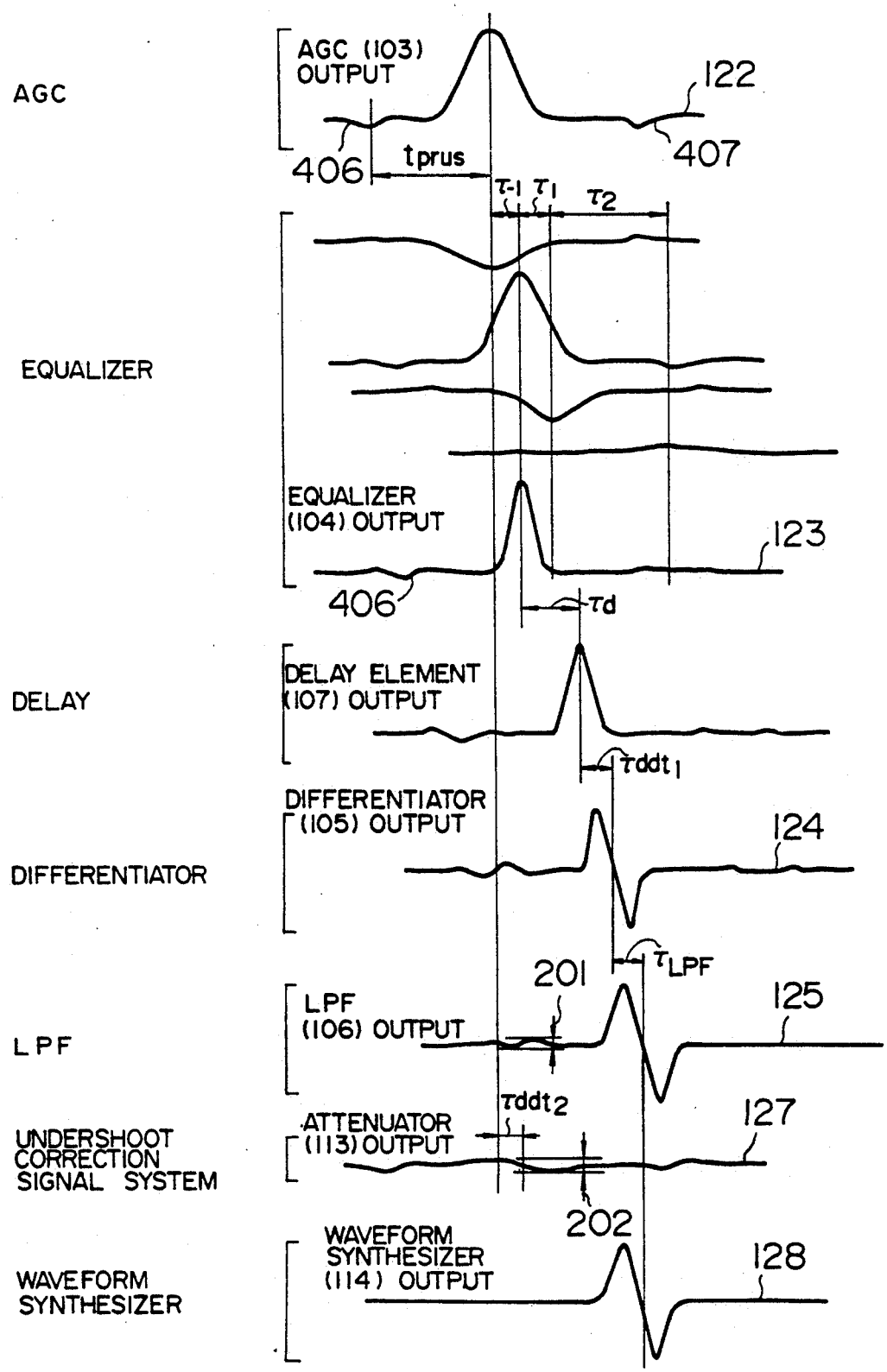
FIG. 2 shows the waveforms generated at respective elements of a reproducing circuit according to the present invention.
Figure 3:
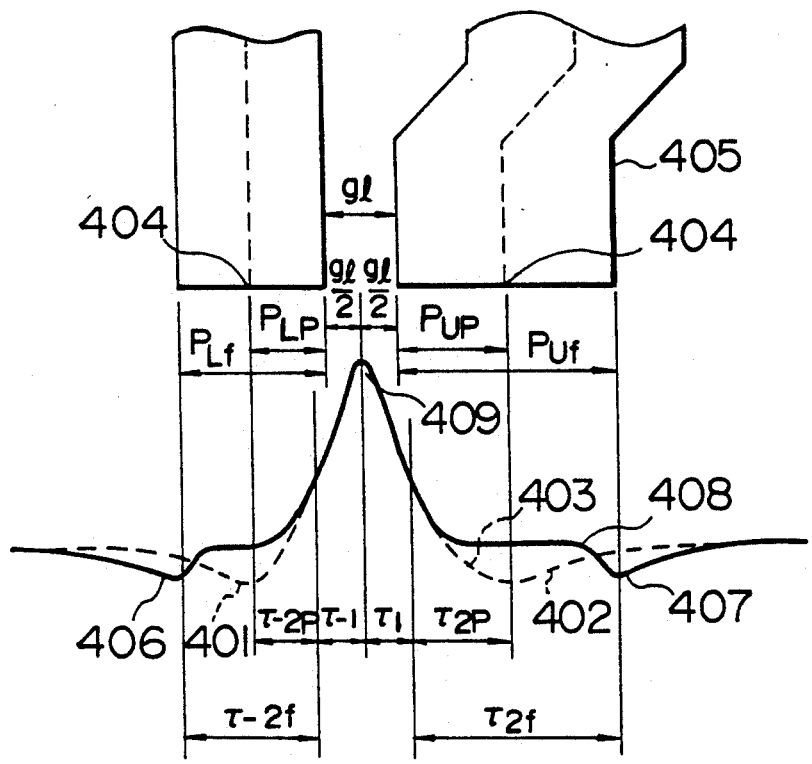
FIG. 3 shows the conceptual comparison between a conventional thin film magnetic head and its reproduced waveform and a thick-pole thin-film magnetic head and its reproduced waveform.
Figure 8:
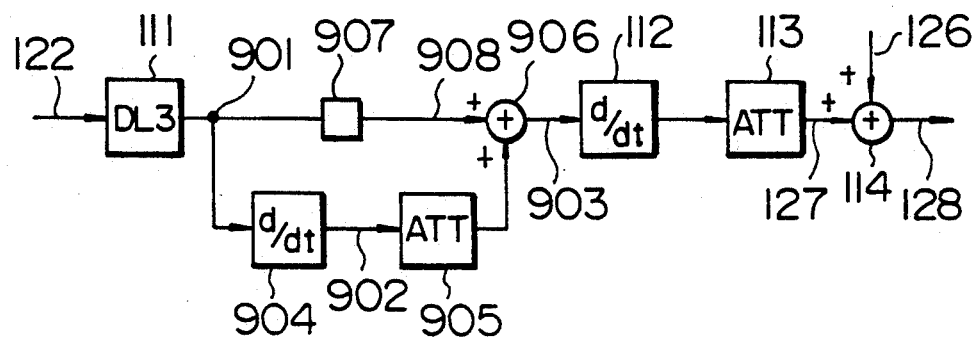
FIG. 8 is a block diagram indicative of a second embodiment of the present invention shown in FIG. 1.
Figure 9:
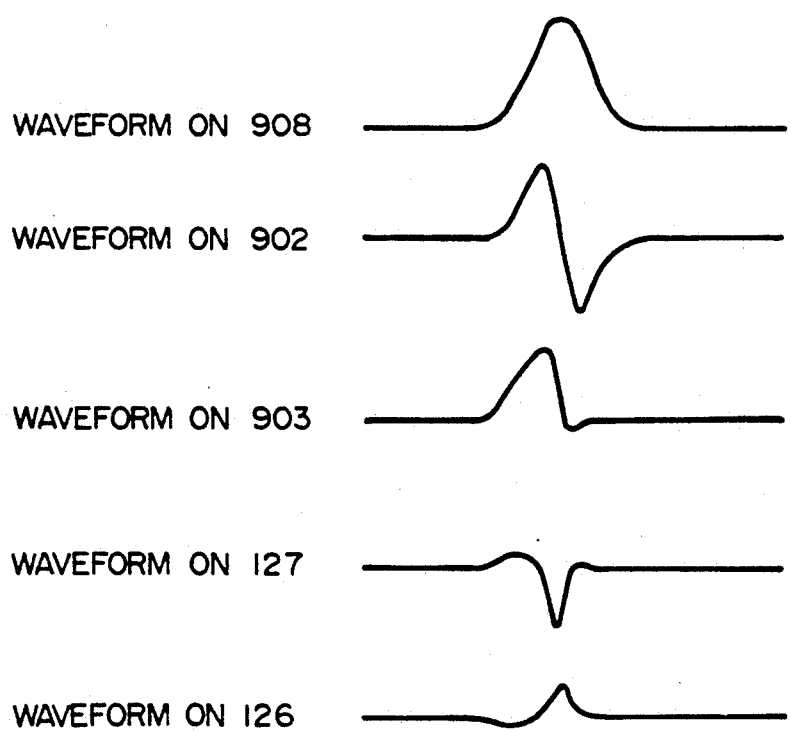
FIG. 9 shows the waveform of the second embodiment main elements of FIG. 8.

A circuit which generates a waveform similar to the undershoot is also inserted in correction circuit system 115 which eliminates pre-undershoot 406 from AGC output 122 of FIG. 1. FIG. 8 shows the circuit configuration of correction circuit system 115 including such a circuit, and FIG. 9 shows the waveforms generated by the respective elements concerned of the system. Output 901 of delay element 111 is input to differentiator 904 and also to adder 906 through timing correction delay element 907. Differentiator 904 and attenuator 905 perform the same function as differentiator 702 and attenuator 703 of the equalizer. In this circuit system, the next adder 906 adds the attenuator output to timing correction delay element output 907 to produce waveform 903 substantially analogously to pre-undershoot 406. The analog waveform 903 is input to differentiator 112 and a quantity of attenuation of attenuator 113 is controlled such that the differentiator 112 output has the same amplitude as the differentiated version 126 of pre-undershoot 406. Output waveform 127 from attenuator 113 is output to adder 114, which adds differentiated version 126 of pre-undershoot 406 and output waveform 127 of attenuator 113 to thereby eliminate a waveform corresponding to pre-undershoot 406. In this case, since a waveform substantially analogous to the undershoot is produced, the undershoot is eliminated effectively.

Figure 12:
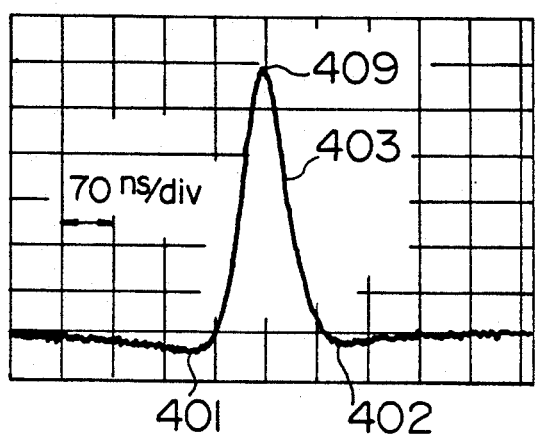
FIG. 12 shows a waveform reproduced by a conventional thin film magnetic head.
Figure 13:
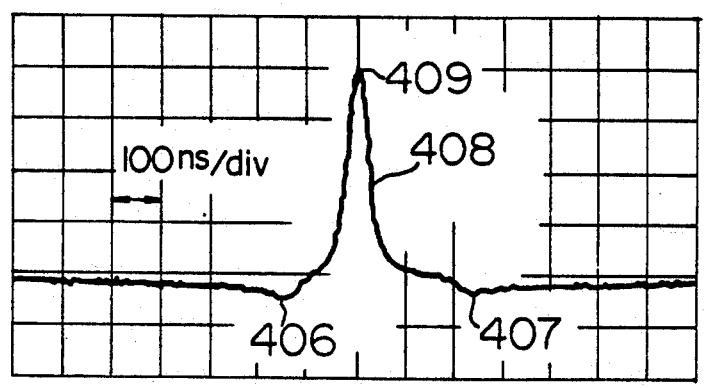
FIG. 13 shows a waveform reproduced by a thick-pole thin-film head.

FIGS. 12 and 13 show the actually measured waveforms reproduced by the conventional thin film magnetic head and thick-pole thin-film magnetic head. The pole thickness of the thick-pole thin-film magnetic head is 1.8 times that of the conventional thin film magnetic head. FIGS. 12 and 13 show that the distance between undershoots of a waveform reproduced by the conventional thin film magnetic head is about 210 ns while the distance between the undershoots of a waveform reproduced by the thick pole head is about 380 ns. It will be seen from this fact that the distance between the undershoots changes in accordance with the ratio in pole thickness. In addition, it will be further seen for the above reason that the distances between the respective undershoots and the main peak are substantially determined by the ratio of one to the other of the distances between the center of the magnetic head gap and ends of the poles.

Figure 14:
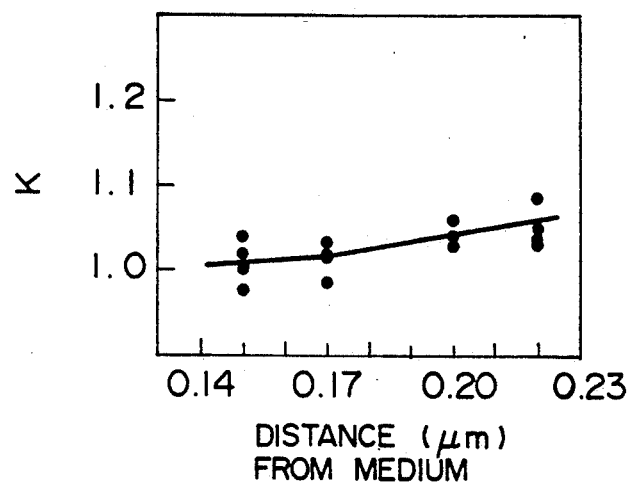
FIG. 14 is a graph of the relationship between the head floating distance and the position of post-undershoots.
Figure 15:
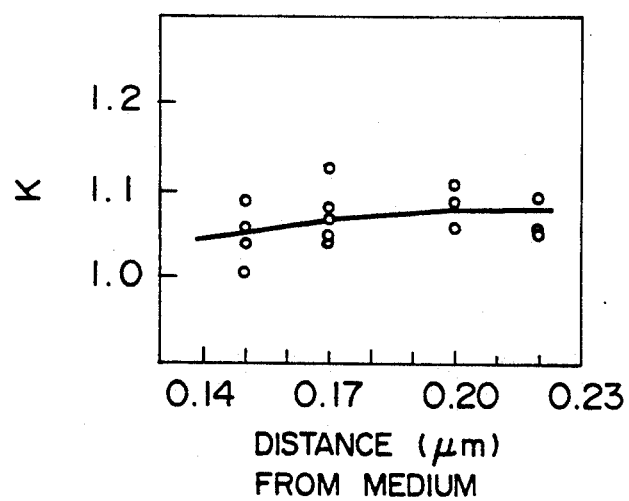
FIG. 15 is a graph of the relationship between the head floating distance and the position of pre-undershoots.

The ratio of the distance from the center of the thin film magnetic head gap to the pole end to the converted value of the distance from the main peak to the undershoot is calculated as a function of a distance from the medium and the results are shown in FIGS. 14 and 15. The converted value of the distance from the main peak to the undershoot is a distance conversion value of the product of the time interval from the main peak to the undershoot and the linear velocity at the radius reproduced isolated waveform of the recording medium.

The axis of ordinates of FIG. 14 represents the ratio k of the converted value of the distance from the main peak to the post undershoot to the distance from the center of the thin film magnetic head gap to the trailing edge (gl/2+Puf). The value k is the coefficient k determined by the floating distance shown in FIG. 3. Similarly, the axis of ordinates of FIG. 15 represents a value k which is the ratio of the converted value of the distance from the main peak to the pre-undershoot to the distance from the center of the thin film magnetic head gap to the leading edge (gl/2+PLf). It will be seen from those results that as the thin film magnetic head moves away from the medium, an undershoot occurs at a position outwardly remote from the pole end.

If the pole length of the head, the relative speed (peripheral speeds) of the recording medium and the head and the distance between the recording medium and the head are known, the positions where the undershoots occur are known from the above relationship and the delay time of the equalizer is required to be set so as to coincide with that position where the undershoot occurs for the signals to suppress the undershoots of the reproduced signal.

Embodiment 3

A third embodiment of equalizer 104 used in the embodiment of the present invention will be described with respect to FIGS. 10 and 11. The equalizer of this embodiment comprises a serial connection of asymmetrical coefficient reflection type equalizer 1200 and a circuit 1210 for correcting post-undershoot 407. Equalizer 1200 thins a reproduced waveform by producing a reflected signal due to a non-matched connection of delay element 1101 and terminating resistor 1103 used conventionally. Output 1109 from equalizer 1200 is input to delay 1105 and also to adder 1108. Since delay element 1105 and resistor 1106 are matched, no reflection occurs at the output of the delay element. The signal time delayed by delay element 1105 so as to coincide in position with post-undershoot 407 is properly attenuated with reference to amplitude by attenuator 1107 and the resulting signal is added to post-undershoot 407 in adder 1108. In this way, signal 123 free from post-undershoot 407 is generated.

Figure 10:
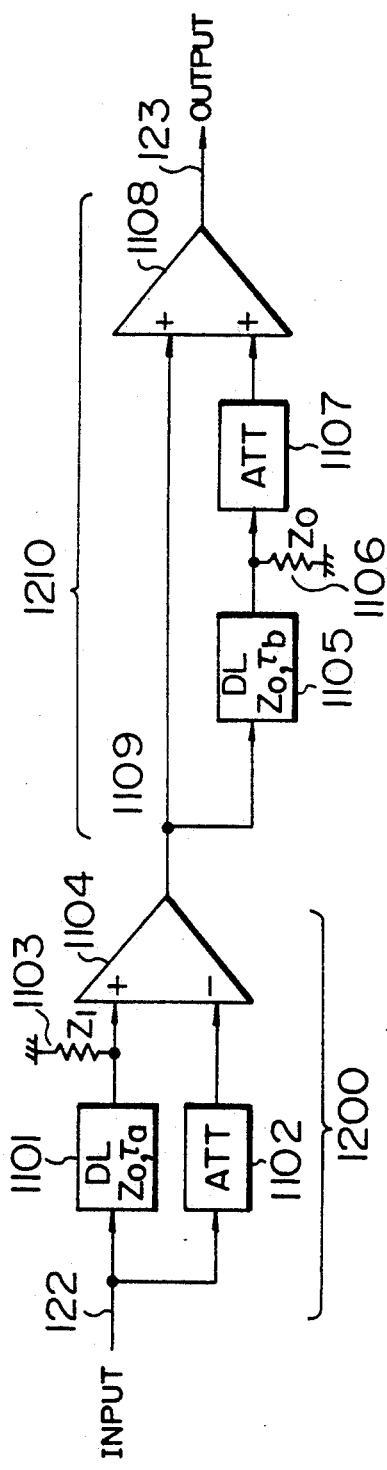
FIG. 10 is a block diagram indicative of a third embodiment of the equalizer used in the present invention.
Figure 11:
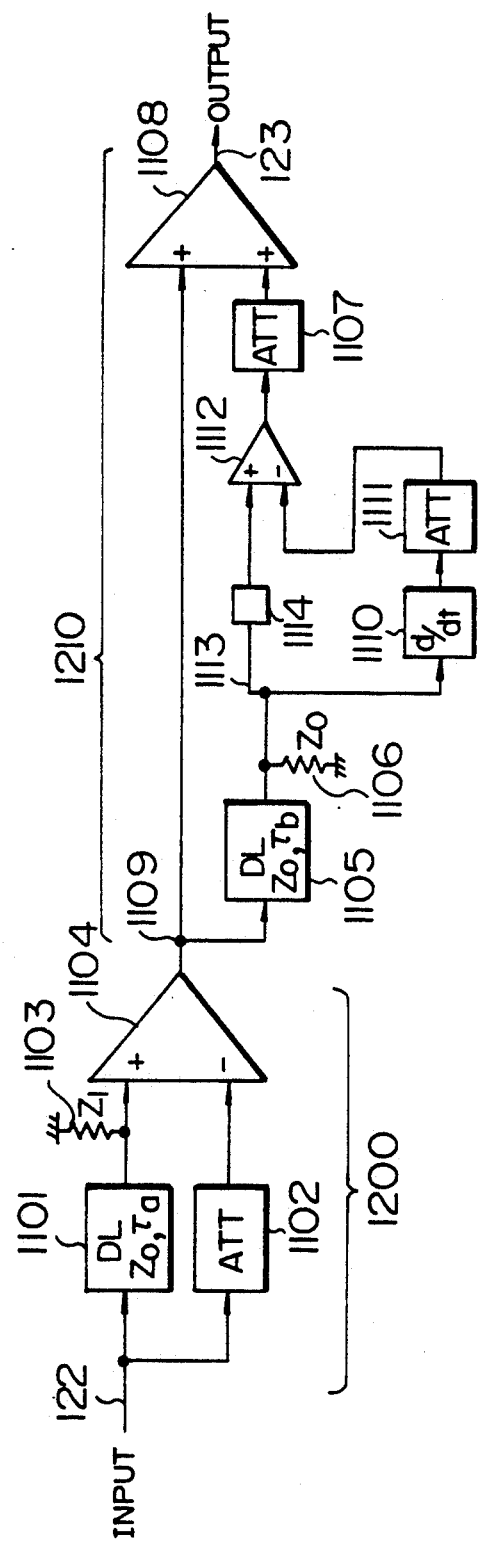
FIG. 11 is a block diagram of a fourth embodiment of the equalizer used in the present invention.

The circuit configuration of FIG. 11 is the same as the circuit of FIG. 10. The portion of circuit 1210 of FIG. 11 is connected with a circuit similar to undershoot correction circuit 701 between terminating resistor 1106 and attenuator 1107.

While the delay elements used in the present embodiment are each shown as a fixed delay element, each may be replaced with a tapped delay element when used with the magnetic disk. Since the magnetic disk has a constant angular speed of rotation, the inner and outer peripheral linear velocities of the disk differs, so that the positions where pre- and post-undershoots occur vary. Therefore, the delay time of the undershoot correction circuit must be changed in accordance with the positions of the undershoots. If the pole length of the magnetic head and the rotational speed of the magnetic disk are determined, the positions where undershoots occur are determined in accordance with the radial position of the magnetic head and the quantity of head floating from the magnetic layer. Using this feature, the circuit which uses the delay elements should be a tapped one, and a tap should be selected using a signal 136 indicative of the radial position of the magnetic head, a head select signal 138 and a zone number signal 137, as mentioned above.

Last, it is known that only removal of post-undershoot 407 greatly reduces the peak shift due to interference by the undershoot. To this end, the circuit configuration is the same as that of FIG. 1 except for pre-undershoot correction signal system 115. The equalizer used may be equalizer 104 which corrects post-undershoot 407. As embodiments, either the transversal equalizer of FIGS. 5 and 6 or a reflective type equalizer shown in FIGS. 10 and 11 may be used.

In accordance with the present invention, waveform equalization distortions are eliminated which are caused by an insufficient transmission characteristic due to the use of delay elements having large delay times in the equalizer. Removal and correction of an undershoot remote from the main peak is also achieved. Therefore, a pattern peak shift due to the interference of the undershoot is reduced, so that high density recording is achieved. In the case where the positions where undershoots occur change due to different peripheral speeds of a magnetic disk, the undershoots are eliminated and corrected. Thus, a pattern peak shift is reduced all over the surface of the magnetic disk.

I claim:

1. A system which records and reproduces a digital signal in the form of a magnetic reversal on and from a recording medium, comprising:

a magnetic head for reproducing magnetic reversal data recorded on a recording medium;

an automatic gain control unit for controlling a signal reproduced from said recording medium so as to have a constant amplitude at a first circuit branch point;

an equalizer operably connected to said automatic gain control unit for processing an output waveform from said automatic gain control unit;

a first differentiator operably connected to said equalizer at a second circuit branch point for differentiating an output from said equalizer to produce a first differentiated waveform;

a first low pass filter operably connected to said first differentiator for limiting the signal band of the first differentiated waveform to a first limited band differentiated waveform signal;

a second low pass filter operably connected to said equalizer at said second circuit branch point for limiting the signal band of the equalizer output to a second limited band waveform;

a pulser operably connected to said first and second low pass filters for receiving the second limited band waveform and the first limited band differentiated waveform signal;

a second differentiator operably connected to said automatic gain control unit at said first circuit branch point for receiving an output from said automatic gain control unit and producing a second differentiated signal from the output signal of said automatic gain control unit;

an attenuator operably connected to said second differentiator for attenuating said second differentiated signal; and waveform processing means operably connected to said attenuator, said pulser and said first low pass filter for adding the attenuated second differentiated signal to the first limited differentiated waveform signal and inputting the resulting signal to said pulser.

2. A system according to claim 1, wherein said waveform processing means comprises first means for differentiating the automatic gain control unit output, second means for attenuating an amplitude of the signal differentiated by said first means, and third means for receiving the signal attenuated by said second means and the first limited band differentiated waveform signal from said equalizer and inputting the output thereof to said pulser.

3. A data reproducing apparatus for reproducing a signal magnetically recorded on a recording medium using a magnetic head, comprising:

an equalizer for receiving a reproduced signal waveform from said magnetic head and equalizing a post-undershoot thereof;

a first differentiator for receiving the output from said equalizer;

a low pass filter for receiving the output from said first differentiator;

a second differentiator for receiving the reproduced signal waveform and for differentiating said reproduced signal waveform; and a first adder for adding the outputs from said second differentiator and said low pass filter.

4. A data reproducing apparatus according to claim 3, wherein said equalizer comprises a first attenuator for attenuating the amplitude of the received signal; a first delay circuit for delaying the received signal; a second delay circuit for delaying the signal delayed by said first delay circuit; a second attenuator for attenuating the amplitude of the signal delayed by said second delay circuit; a third delay circuit for delaying the signal delayed by said second delay circuit: a third attenuator for attenuating the amplitude of the signal delayed by said third delay circuit; and an adder for adding the output from said first attenuator, the output from said first delay circuit, the output from said second attenuator and the output from said third attenuator.

5. A data reproducing apparatus according to claim 4, comprising, between said third delay circuit and said third attenuator, a third differentiator for differentiating the output from said third delay circuit; a fourth attenuator for attenuating the output from said third differentiator; a subtracter for subtracting the output of said fourth attenuator from the output of said third delay circuit; and means for inputting the output from said subtracter to said third attenuator.

6. A data reproducing apparatus according to claim 3, comprising, between said magnetic head and said second differentiator, a third differentiator for differentiating the reproduced signal waveform; an attenuator for attenuating the signal differentiated by said third differentiator; and a second adder for adding the reproduced signal and the signal attenuated by said attenuator and for inputting the output from said second adder to said second differentiator.

7. A data reproducing apparatus according to claim 3, wherein said equalizer comprises a first delay circuit for delaying the reproduced signal waveform; a first impedance element provided at the output of said first delay circuit; a first attenuator for attenuating the reproduced signal waveform; a subtracter for subtracting an output signal of said first attenuator from the output of said first delay circuit; a second delay circuit for delaying the output from said subtracter; a second impedance element provided at the output of said second delay circuit; a second attenuator for attenuating the output from said second impedance element; and a second adder for adding the output from said subtracter and the output from said second attenuator and for inputting the output from said second adder to said first differentiator.

8. A data reproducing apparatus according to claim 7, comprising, between said second delay circuit and said second attenuator, a third differentiator for differentiating the output from said second delay circuit, a third attenuator for attenuating the output from said third differentiator; and a second subtracter for subtracting the output of said third attenuator from the output of said second delay circuit and for inputting the output from said second subtracter to said second attenuator.

9. A method of recording and reproducing a digital signal in the form of a magnetic reversal on and from a recording medium, comprising the steps of:

extracting a reproduced signal from said recording medium using a magnetic head;

dividing the reproduced signal into two;

causing one of the divided signals to pass through a first system comprising an equalizer, a differentiator and a low pass filter;

causing the other of the divided signals to pass through a second system comprising a differentiator and an attenuator;

synthesizing the outputs from said first and second systems to equalize the reproduced waveform; and setting the difference between the times required for the signals to pass through said first and second systems such that an undershoot portion of the reproduced waveform in said first system overlaps with the reproduced signal portion in said second system.

10. A method according to claim 9, further comprising the step of delaying the divided reproduced signal of the first system with respect to the divided reproduced signal of the second system by using a delay element in the first system.

11. A method according to claim 9, further comprising the step of delaying the divided reproduced signal of the second system with respect to the divided reproduced signal of the first system by using a delay element in the second system.

12. A method according to claim 9, comprising the step of controlling the signal delay time in the first system using a characteristic in which the signal transmission time changes depending on the cutoff frequency of the low pass filter.

* * * * *